United States Patent
Wenderoth et al.

(10) Patent No.: US 12,478,304 B2
(45) Date of Patent: Nov. 25, 2025

(54) METHOD AND ASSEMBLY FOR DETERMINING A REPRESENTATION WHICH INDICATES THE ACTIVITY OF A LOCUS COERULEUS SYSTEM OF A USER

(71) Applicant: ETH Zurich, Zurich (CH)

(72) Inventors: Nicole Wenderoth, Zürich (CH); Sarah Meissner, Zürich (CH); Marc Bächinger, Dübendorf (CH)

(73) Assignee: ETH Zurich, Zurich (CH)

( * ) Notice: Subject to any disclaimer, the term of this patent is extended or adjusted under 35 U.S.C. 154(b) by 642 days.

(21) Appl. No.: 17/800,455

(22) PCT Filed: Feb. 15, 2021

(86) PCT No.: PCT/EP2021/053621
§ 371 (c)(1),
(2) Date: Aug. 17, 2022

(87) PCT Pub. No.: WO2021/165193
PCT Pub. Date: Aug. 26, 2021

(65) Prior Publication Data
US 2023/0106227 A1  Apr. 6, 2023

(30) Foreign Application Priority Data
Feb. 18, 2020 (EP) .................... 20157923

(51) Int. Cl.
*A61B 5/16* (2006.01)
*A61B 3/11* (2006.01)
*A61B 5/00* (2006.01)

(52) U.S. Cl.
CPC .............. *A61B 5/163* (2017.08); *A61B 5/165* (2013.01); *A61B 5/6803* (2013.01);
(Continued)

(58) Field of Classification Search
CPC ....... A61B 5/163; A61B 5/165; A61B 5/6803; A61B 5/7203; A61B 5/7246; A61B 5/743;
(Continued)

(56) References Cited

U.S. PATENT DOCUMENTS

| 6,097,295 A | 8/2000 | Griesinger et al. |
| 2019/0167095 A1 | 6/2019 | Krueger |

FOREIGN PATENT DOCUMENTS

| DE | 19803158 C1 | 5/1999 |
| EP | 2853937 A1 | 4/2015 |

(Continued)

OTHER PUBLICATIONS

International Search Report & Written Opinion for PCT/EP2021/053621, dated Apr. 15, 2021, 15 pages.
(Continued)

*Primary Examiner* — Eric F Winakur
*Assistant Examiner* — Hy Khanh Doan
(74) *Attorney, Agent, or Firm* — BLANK ROME LLP

(57) ABSTRACT

According to the present invention there is provided a computer implemented method for determining a representation which indicates the activity of a locus coeruleus system of a user, comprising the steps of, measuring the size of a pupil of a user; providing a representation the appearance of which is based on the measured size of the pupil. There is also provided a method for estimating the activity of a locus coeruleus system of a user. There is also provided assemblies which can be used to perform said afore-mentioned methods.

14 Claims, 5 Drawing Sheets

--- measuring the size of the pupil of a user (1)

providing a representation the appearance of which is based on the measured size of the pupil (2)

(52) U.S. Cl.
CPC .......... *A61B 5/7203* (2013.01); *A61B 5/7246* (2013.01); *A61B 5/743* (2013.01); *A61B 3/112* (2013.01)

(58) Field of Classification Search
CPC ........ A61B 3/112; G16H 50/30; G16H 50/50; G16H 50/20
See application file for complete search history.

(56) References Cited

FOREIGN PATENT DOCUMENTS

| KR | 20130057603 A | * | 6/2013 |
| KR | 101303354 B1 | | 9/2013 |
| WO | WO-2005/051181 A1 | | 6/2005 |

OTHER PUBLICATIONS

S. Joshi, et al., "Relationships Between Pupil Diameter and Neuronal Activity in the Locus Coeruleus, Colliculi, and Cingulate Cortex", Cell Press Open Access, Neuron. Jan. 6, 2016; 89 (1):221-34. Doi: 10.1016/j.neuron.2015.11.028. Epub Dec. 17, 2015.; 2 pgs.

D. Alnæs, et al., "Pupil Size Signals Mental Effort Deployed During Multiple Object Tracking and Predicts Brain Activity in the Dorsal Attention Network and the Locus Coeruleus", Journal of Vision, Apr. 2014, vol. 14, 1. doi:https://doi.org. 10.1167/14.4.1, 32 pgs.

P. R. Murphy, et al., "Pupil Diameter Covaries with BOLD Activity in Human Locus Coeruleus", Human Brain Mapping, Aug. 2014.; 35(8); 27 pgs.

V. D. Costa, et al., "More Than Meets the Eye: the Relationship Between Pupil Size and Locus Coeruleus Activity", Elsevier Inc.; Neuron, 89, Jan. 6, 2016, 3 pgs.

* cited by examiner

METHOD AND ASSEMBLY FOR DETERMINING A REPRESENTATION WHICH INDICATES THE ACTIVITY OF A LOCUS COERULEUS SYSTEM OF A USER

RELATED APPLICATION

This application is a national phase application of PCT/EP2021/053621, filed Feb. 15, 2021, and claims priority to EP20157923.2, filed Feb. 18, 2020. The entire contents of this application is hereby incorporated by reference.

TECHNICAL DOMAIN

The present invention relates to a computer implemented method and assembly for determining a representation which indicates the activity of a locus coeruleus system of a user; and in particular to a computer implemented method and assembly which involves determining a representation which indicates the activity of a locus coeruleus system of a user based on a measurement of the diameter of a pupil of the user . . . .

BACKGROUND

The locus coeruleus is a nucleus in the pons of the brainstem involved with physiological responses to factors such as stress and panic. It is a part of the reticular activating system.

Typical means in the art for measuring/monitoring arousal and/or stress in a subject, includes monitoring variables such as the pulse, blood pressure and/or skin conductivity of the subject. However, changes in these variables is delayed in reaction to arousal and/or stress experienced by the subject; accordingly, these variables do not accurately represent the instantaneous state of the subject, and therefore also do not accurately represent the instantaneous state of the locus coeruleus system of the subject. Moreover, changes in these variables can be easily caused by factors other than the locus coeruleus system, and therefore these variables do not accurately represent the state of the locus coeruleus system of the subject.

Therefore, existing solutions for in the art are inadequate for measuring/monitoring the activity of the locus coeruleus system of a subject.

Furthermore, existing solutions in the field do not provide any assistance to the subject, based on the level of arousal and/or stress measured, to modify the instantaneous activity of their locus coeruleus system.

It is an objective of the present invention to obviate or mitigate the above-mentioned disadvantages.

SUMMARY OF THE INVENTION

According to an aspect of the present invention there is provided a computer implemented method for determining a representation which indicates the activity of a locus coeruleus system of a user having the steps set out in claim 1.

There is further provided an assembly which can used to perform the method of the present invention.

In the present invention the representation of the activity of the locus coeruleus system of the user is based on a measurement of the diameter of the pupil of the user; any changes in the activity of the locus coeruleus system will be immediately indicated by a changes in the diameter of the pupil of the user. Thus advantageously, in the present invention a more accurate representation of the instantaneous activity of the locus coeruleus system of the user can be provided. Furthermore, a more accurate measurement/monitoring of the instantaneous activity of the locus coeruleus system of the user can be estimated.

Optional features of the present invention are recited in the dependent claims

BRIEF DESCRIPTION OF THE DRAWINGS

Exemplary embodiments of the invention are disclosed in the description and illustrated by the drawings in which.

DETAILED DESCRIPTION OF EMBODIMENTS OF THE PRESENT INVENTION

Figure 1:
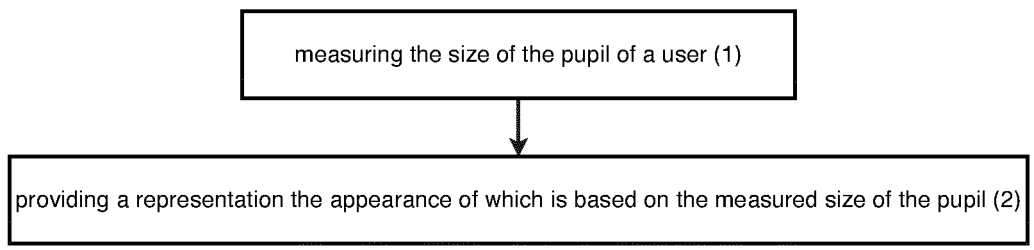
FIG. 1 is a flow chart illustrating the steps carried out in a computer implemented method, according to the present invention, for determining a representation which indicates the activity of a locus coeruleus system of a user.

FIG. 1 is a flow chart illustrating the steps carried out in a computer implemented method, according to an aspect of the present invention, for determining a representation which indicates the activity of a locus coeruleus system of a user.

The method comprises at least the steps of, measuring the size of a pupil of a user (1); providing a representation the appearance of which is based on the measured size of the pupil (2).

It will be understood that the representation may take any suitable form. Most preferably the representation is a visual representation. For example, the visual representation is a spot which is displayed on a display screen, and the size of the spot is proportional to the measured size of the pupil (for example is proportional to the measured diameter of the pupil). In another example the visual representation may be a scale which is displayed on a display, and the value appearing on the scale or the colour of the scale, depends on the measured size of the pupil.

Most preferably the step of measuring the size of the pupil comprises measuring the diameter of the pupil.

The size of the user's pupil can be used as an indicator for the activity of a locus coeruleus system of a user; the size of the user's pupil will change according to changes in activity of the locus coeruleus system of the user; when the activity of the locus coeruleus system of the user increases then the size of the pupil of the user will correspondingly increase; likewise when the activity of a locus coeruleus system of the user decreases then the size of the pupil of the user will correspondingly decrease. Thus, the size of the pupil of the user can be used as an indictor for the current activity of a locus coeruleus system of the user. So, for example, in one embodiment of the present invention, by providing a spot on display screen whose size is proportional to the measured size of the user's pupil, changes in the size of the spot will indicate the user how the activity of their coeruleus system is changing; if the size of the spot appearing on the display screen increases, then the user can know that the activity of their coeruleus system is increasing; likewise if the size of the spot appearing on the display screen decreases in size then the user can know that the activity of their coeruleus system is decreasing. It should be understood that in the present invention the visual representation is not limited to being a spot; the visual representation could have any suitable shape.

According to a further aspect of the present invention there is provided a computer implemented method for estimating the activity of a locus coeruleus system of the user, the method comprising the steps of, measuring the size of a pupil of a user; converting the measured size of the pupil into an estimate of the activity of a locus coeruleus system of the user. In one embodiment the step of converting the measured size of the pupil into an estimate of the activity of a locus coeruleus system of the user comprises using a predefined conversion formula to convert the measured size of the pupil into an estimate of the activity of a locus coeruleus system of the user. An exemplary predefined conversion formula has the form LC(p)=k*p+c, wherein, 'p' is the measured pupil size, 'k' is a factor which describes the conversion from pupil size into activity of the locus coeruleus system (LC) and, and 'c' is an offset between the pupil size and locus coeruleus activity. It should be understood that the variable 'c' is included in the predefined conversion formula only if there is some offset between the pupil size and locus coeruleus activity. This exemplary predefined conversion is derived from the observation that the ratio of the relative rate of change of both the pupil size 'p' and activity of the locus coeruleus system (LC) is constant under isoluminance (i.e. dLC/dp=k). Integration of dLC/dp=k with respect to variable 'p' leads to the linear equation LC(p)= k*p+c which defines the above-mentioned exemplary predefined conversion formula. In humans, a typical measure of locus coeruleus system activity can be done by measuring blood oxygen level dependent (BOLD) signal which is recorded during functional magnetic resonance imaging (fMRI); this typical measure is essentially the ratio of magnetic susceptibility of oxygenated blood divided by the magnetic susceptibility of deoxygenated blood and therefore unitless. Accordingly, the variable 'k' has units [mm−1] and variable 'c' is unitless and both can be estimated by measuring both (pupil size and LC activity) at the same time. In another embodiment there is provided a memory which has stored in it a deterministic algorithm, which, when provided with an inputs in the form of the diameter of a pupil of the user, and is executed, will provide as an output an estimate the activity of a locus coeruleus system; in this embodiment the method further comprises the steps of inputting the measured size of the pupil into the deterministic algorithm, and outputting from the deterministic algorithm an estimate of the activity of a locus coeruleus system of the user. In another embodiment there is provide a memory which has stored in it a machine learning algorithm, which when provided with inputs in the form of, the diameter of a pupil of the user, and is executed, will provide as an output said estimate the activity of a locus coeruleus system; in this embodiment the method further comprises the steps of inputting the measured size of the pupil into the machine leaning algorithm, and outputting from the machine leaning algorithm an estimate of the activity of a locus coeruleus system of the user.

It should be understood that the afore-mentioned methods could be combined to provide a computer implemented method for determining a representation which indicates the activity of a locus coeruleus system of a user and for estimating the activity of a locus coeruleus system of the user; for example the method may comprise the steps of, measuring the size of a pupil of a user; providing a representation the appearance of which is based on the measured size of the pupil; and converting the measured size of the pupil into an estimate of the activity of a locus coeruleus system of the user.

Any one of the afore-mentioned methods may comprise providing the user with a predefined stimulus. The predefined stimulus may comprise one or more of, a predefined visual stimulus, a predefined audio stimulus, a predefined haptic stimulus, and/or a predefined olfactory stimulus. Preferably the stimulus is designed to increase or decrease the activity of a locus coeruleus system of the user. In a preferred embodiment of the present invention the method comprises determining a representation which indicates the activity of a locus coeruleus system of a user prior to providing the user with said predefined stimulus; and determining a representation which indicates the activity of a locus coeruleus system of a user after providing the user with said predefined stimulus. Both representations may be displayed on the display screen so that user can see how the activity of their locus coeruleus system changed in response to the predefined stimulus.

Any one of the afore-mentioned methods may further comprise the steps of measuring light conditions to which said user is exposed and compensating for changes in light conditions so that the user is exposed to a predefined constant light level.

Figure 2:
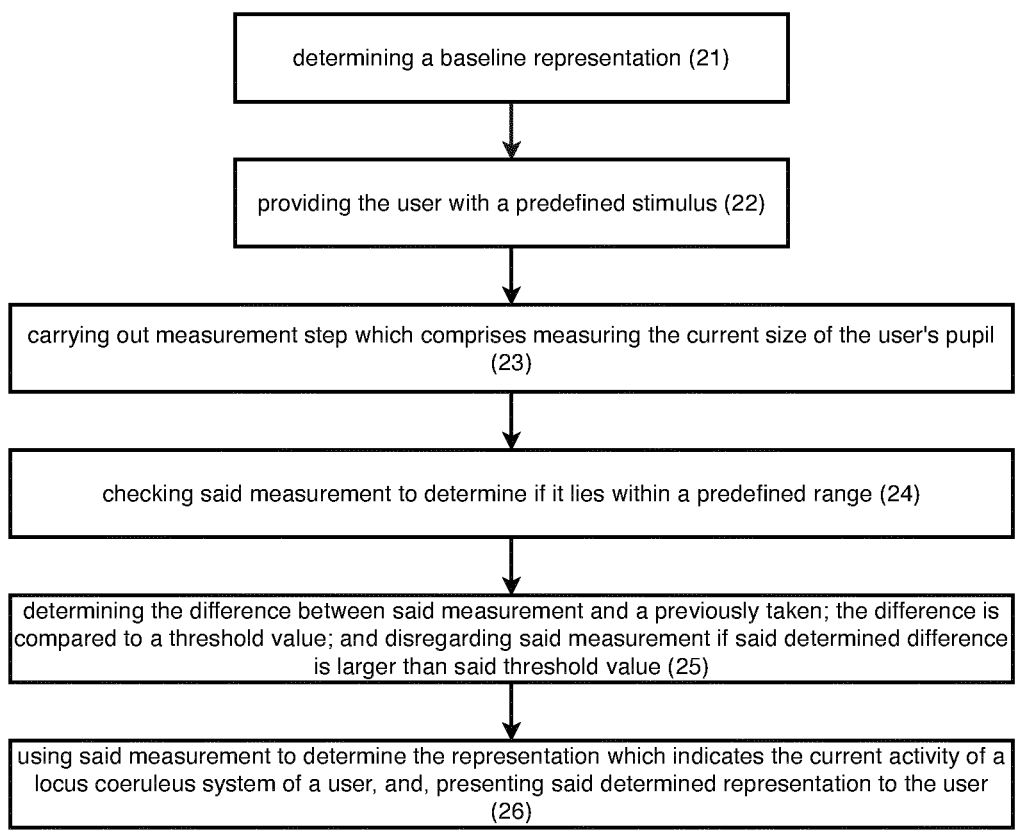
FIG. 2 illustrates the steps carried out in a computer implemented method according to a first embodiment of the present invention.

FIG. 2 illustrates the steps carried out in a computer implemented method according to a first embodiment of the present invention for, determining a representation which indicates the activity of a locus coeruleus system of a user.

In this embodiment a baseline representation is first determined (21); the baseline representation is a representation which is indicative of the initial activity of a locus coeruleus system of a user before the system operates to provide the user with a predefined stimulus. The baseline representation will form a reference; representations which will be subsequently determined (e.g. after providing the user with a predefined stimulus), can be compared to the baseline representation to allow the user to identify if the activity of their locus coeruleus system has increased or decreased in response to the predefined stimulus.

In this embodiment the baseline representation of the initial activity of a locus coeruleus system of a user is in the form of a reference spot which is displayed on a display screen, the size of the reference spot being proportional to a reference size measurement, wherein said reference size measurement is determined from measurements of the user's pupil size which are taken before the system operates to provide the user with a predefined stimulus. It should be understood that the baseline representation of the initial activity of a locus coeruleus system of a user make take any suitable form and is not limited to being in the form of a reference spot which is displayed on a display screen.

Preferably the baseline representation is determined by sampling the pupil size of the user, for a predefined time period, and at a predefined sampling rate, to provide a sample let of values for the for the size of the pupil of the user. Preferably the baseline representation is determined by sampling the pupil size of the user, for at least 5 seconds, at sampling rate of at least 60 Hz, to provide a sample set of values for the size of the pupil of the user. In this example the size of the pupil of the user is defined by the diameter of the pupil; in other words at each sample the diameter of the user's pupil is measured; and thus the resulting sample set comprises a plurality of diameter values.

Then the sample set is filtered.

Filtering the sample set preferably comprises removing the samples which were taken during a predefined time period from starting sampling. Preferably filtering the sample set comprises removing the samples which were taken during the first 2 seconds of starting sampling; the samples taken within the first 2 seconds can be corrupt due to potential light adaptations undergone by the user's pupil.

Filtering the sample set may further comprise, removing from the sample set those samples which are not within a predefined range. Preferably filtering the sample set further comprises removing from the sample set those samples which are smaller than 1.5 mm and larger than 9 mm. If for example a sample is taken while the user is blinking then the sample value will be '0' millimetre; thus removing those samples from the sample set which are not within the range 1.5 mm-9 mm allows to filter out those samples in the sample set which are not meaningful.

Filtering the sample set may further comprise, removing from the sample set those samples values which differ from an immediately previous sample value, by more than a predefined amount. Preferably filtering the sample set further comprises, removing from the sample set, those samples values which differ from an immediately previous sample value, by more than 0.16 mm. Preferably this is done after the steps of removing the samples which were taken during a predefined time period (e.g. during the first 2 seconds of starting sampling) and removing from the sample set those samples which are not within a predefined range (e.g. those samples which are smaller than 1.5 mm and larger than 9 mm), have been performed.

After the sample set has been filtered said reference size measurement is then determined from the sample set using an initialization rule. It should be understood that the initialization rule may take any suitable form. In the most preferred embodiment the initialization rule is simply the average of all the sample values remaining in the sample set after the sample set has been filtered. In other words in this preferred embodiment the reference size measurement is equal to the average of all the sample values remaining in the sample set after the sample set has been filtered.

As mentioned, in this preferred embodiment the baseline representation of the initial activity of a locus coeruleus system of the user is in the form of a reference spot which is displayed on a display screen; thus a spot, having dimensions which are proportional to the reference size measurement (which in this embodiment is equal to the average of all the sample values remaining in the sample set after the sample set has been filtered), is displayed on the display screen so as to provide the baseline representation.

In one embodiment a further step of using a predefined conversion formula to convert the reference size measurement into an estimate of the activity of a locus coeruleus system of the user, is carried out so as to provide a baseline estimate of the activity of the locus coeruleus system of the user. An exemplary predefined conversion formula has the form: $LC(p)=k*p+c$, wherein, 'p' is the measured pupil size, 'k' is a factor which describes the conversion from pupil size into activity of the locus coeruleus system (LC) and, and 'c' is an offset between the pupil size and locus coeruleus activity. It should be understood that the variable 'c' is included in the predefined conversion formula only if there is some offset between the pupil size and locus coeruleus activity. This exemplary predefined conversion is derived from the observation that the ratio of the relative rate of change of both the pupil size 'p' and activity of the locus coeruleus system (LC) is constant under isoluminance (i.e. $dLC/dp=k$). Integration of $dLC/dp=k$ with respect to variable 'p' leads to the linear equation $LC(p)=k*p+c$ which defines the above-mentioned exemplary predefined conversion formula. In humans, a typical measure of locus coeruleus system activity can be done by measuring blood oxygen level dependent (BOLD) signal which is recorded during functional magnetic resonance imaging (fMRI); this typical measure is essentially the ratio of magnetic susceptibility of oxygenated blood divided by the magnetic susceptibility of deoxygenated blood and therefore unitless. Accordingly, the variable 'k' has units [mm−1] and variable 'c' is unitless and both can be estimated by measuring both (pupil size and LC activity) at the same time. In another embodiment there is provided a memory which has stored in it a deterministic algorithm, which, when provided with an inputs in the form of the diameter of a pupil of the user, and is executed, will provide as an output an estimate the activity of a locus coeruleus system; in this embodiment the method further comprises the steps of inputting the reference size measurement into the deterministic algorithm, and outputting from the deterministic algorithm a baseline estimate of the activity of the locus coeruleus system of the user. In another embodiment there is provide a memory which has stored in it a machine learning algorithm, which when provided with inputs in the form of, the diameter of a pupil of the user, and is executed, will provide as an output said estimate the activity of a locus coeruleus system; in this embodiment the method further comprises the steps of inputting the reference size measurement into the machine leaning algorithm, and outputting from the machine leaning algorithm a baseline estimate of the activity of the locus coeruleus system of the user.

After the baseline representation of the activity of the locus coeruleus system of the user has been determined, then a representation which indicates the current activity of a locus coeruleus system of a user is determined and is presented to the user.

In this embodiment the representation which indicates the current activity of a locus coeruleus system of a user is in the form of a spot which is displayed on a display screen, the size of the spot being proportional to a measurement which is determined from measurements of the user's pupil size which are taken after the system operates to provide the user with a predefined stimulus. It should be understood that the representation which indicates the current activity of a locus coeruleus system of the user may take any suitable form and is not limited to being in the form of a spot which is displayed on a display screen.

In this embodiment in order to determine the representation which indicates the current activity of a locus coeruleus system of a user, the following steps are carried out:

(a) Firstly, the user is provided with a predefined stimulus (22). The predefined stimulus is designed to either cause an increase in the activity of the locus coeruleus system of the user, or, is designed to cause a decrease in the activity of the locus coeruleus system of the user. The predefined stimulus may comprise one or more of, a predefined visual stimulus, a predefined audio stimulus, a predefined haptic stimulus, and/or a predefined olfactory stimulus. The stimulus to increase activity in the locus coeruleus system of the user could be, for example, an image of a spider (if the user is afraid of spiders) (or some other image which triggers a stress in the user) presented to the user on the display screen; and/or a loud high-pitch tone played via loudspeakers; and/or an uncomfortable vibration applied via haptic actuators; and/or an obnoxious smell. Conversely, the stimulus to decrease activity in the locus coeruleus system of the user could be a simple dot; and/or a pleasant picture; and/or a melodic sound; and/or a pleasant vibration or smell.

(b) Secondly, a measurement step is carried out which comprises measuring the current size of the user's pupil (23). This measurement step is preferably carried out by an eye-tracking sensor. In this example the size of the pupil of the user is represented by the diameter of the pupil; thus the measurement step comprises measuring the diameter of the pupil of the user.

(c) Thirdly, said measurement is checked to determine if it lies within a predefined range (24). Said predefined range is preferably a physiological range. In this example a check is made to determine if the measurement (i.e. the measured diameter of the pupil) lies within the predefined range 1.5 mm–9 mm; in the majority of cases it is not possible for the pupil to have a diameter outside of the range 1.5 mm-9 mm. If the measurement does not fall within said predefined range then the measurement is disregarded and another measurement is taken by repeating the measurement step.

(d) Fourthly, in the preferred embodiment, provided that said measurement does lie within the predefined range, the difference between said measurement and a previously taken measurement is determined, and the difference is compared to a threshold value; said measurement is disregarded if said determined difference is larger than said threshold value and another measurement is taken by repeating the measurement step (25). For example, in the preferred embodiment if the difference between said measurement and a previously taken measurement is more than 0.16 mm then the measurement is disregarded and another measurement is taken by repeating the measurement step.

If there is no previously taken measurement (i.e. the measurement step was carried out for the very first time) then the reference size measurement is used instead; in other words, the difference between said measurement and reference size measurement is determined, and said determined difference is then compared to a threshold value; said measurement is disregarded if said determined difference is larger than said threshold value and another measurement is taken by repeating the measurement step.

(e) Fifthly, provided that the measurement has not been disregarded in any of the preceding steps, said measurement is then used to determine the representation which indicates the current activity of a locus coeruleus system of a user; and presenting said determined representation to the user (26).

As mentioned, in this embodiment the representation which indicates the current activity of a locus coeruleus system of a user is in the form of a spot which is displayed on a display screen; the dimensions of the spot are proportional to said measurement. Thus, in this embodiment a spot having dimensions which are proportional to said measurement is displayed on a display screen so that the user is provided with a visual representation which indicates the current activity of their locus coeruleus system. If the activity of the locus coeruleus system of the user increases in response to the predefined stimulus, the size of the pupil of the user will increase, and thus said measurement will increase which in turn results in an increase in the size of the spot which is displayed on the display screen. Likewise, if the activity of the locus coeruleus system of the user decreases in response to the predefined stimulus, then the size of the pupil of the user will increase, and thus said measurement will decrease which in turn results in an decrease in the size of the spot which is displayed on the display screen.

In another embodiment a previously presented representation of the activity of the user's locus coeruleus system is updated based on said measurement and an update rule, so that the representation which is displayed on the display screen represents the current activity of the user's locus coeruleus system. For example the update rule may be an average of the previous measurement (which has not been disregarded in any of the preceding steps) of the size of the users pupil and the most recent measurement (which has not been disregarded in any of the preceding steps) of the size of the users pupil. Thus in one embodiment the steps of, determining the average of the a previous measurement and the most recent measurement (which has not been disregarded in any of the preceding steps), is carried out; and adjusting the size of spot which is displayed on the display screen so that the spot has dimensions which are proportional to said average, so that the user is provided with an updated representation (i.e. visual representation) which indicates the current activity of a locus coeruleus system of the user.

If no previous measurement has been taken then the reference size measurement is used instead; in other words the average of said measurement and the reference size measurement is taken; and the size of the spot which is displayed on the display screen is adjusted so that it has dimensions which are proportional to said average, so that the user is provided with an updated representation (i.e. visual representation) which indicates the current activity of a locus coeruleus system of the user.

In one embodiment a previous representation of the activity of the user's locus coeruleus system and the most recent representation may be displayed simultaneously on the display screen so that the user can see how the activity of the activity of their locus coeruleus system has changed since the previous measurement. For example, the method may comprise simultaneously displaying on the display screen, a first spot which has dimensions proportional a previous measurement of the size of the user's pupil, and a second spot which has dimensions proportional to the most recent measurement of the size of the user's pupil. If no previous measurement of the size of the user's pupil has been taken then the reference size measurement is preferably used instead i.e. the first spot has dimensions proportional to the reference size measurement, and a second spot has dimensions proportional to the most recent measurement of the size of the user's pupil.

In one embodiment the reference size measurement is subtracted from said measurement to provide a differential pupil size value. The differential pupil size value is presented to the user. If the differential pupil size value is a positive value then this will indicate to the user that the activity of their locus coeruleus system has increased in response to the predefined stimulus which was provided; if the differential pupil size value is a negative value then this will indicate to the user that the activity of their locus coeruleus system has decreased in response to the predefined stimulus which was provided.

In one embodiment a further step of using a predefined conversion formula to convert said measurement (which has not been disregarded in any of the preceding steps) into an estimate of the activity of a locus coeruleus system of the user, is carried out so as to provide an estimate of the current activity of the locus coeruleus system of the user. An exemplary predefined conversion formula has the form:

LC(p)=k*p+c, wherein, 'p' is the measured pupil size, 'k' is a factor which describes the conversion from pupil size into activity of the locus coeruleus system (LC) and, and 'c' is an offset between the pupil size and locus coeruleus activity. It should be understood that the variable 'c' is included in the predefined conversion formula only if there is some offset between the pupil size and locus coeruleus activity. This exemplary predefined conversion is derived from the observation that the ratio of the relative rate of change of both the pupil size 'p' and activity of the locus coeruleus system (LC) is constant under isoluminance (i.e. dLC/dp=k). Integration of dLC/dp=k with respect to variable 'p' leads to the linear equation LC(p)=k*p+c which defines the above-mentioned exemplary predefined conversion formula. In humans, a typical measure of locus coeruleus system activity can be done by measuring blood oxygen level dependent (BOLD) signal which is recorded during functional magnetic resonance imaging (fMRI); this typical measure is essentially the ratio of magnetic susceptibility of oxygenated blood divided by the magnetic susceptibility of deoxygenated blood and therefore unitless. Accordingly, the variable 'k' has units [mm−1] and variable 'c' is unitless and both can be estimated by measuring both (pupil size and LC activity) at the same time. In another embodiment there is provided a memory which has stored in it a deterministic algorithm, which, when provided with an inputs in the form of the diameter of a pupil of the user, and is executed, will provide as an output an estimate the activity of a locus coeruleus system; in this embodiment the method further comprises the steps of inputting the measurement (which has not been disregarded in any of the preceding steps) into the deterministic algorithm, and outputting from the deterministic algorithm an estimate of the current activity of the locus coeruleus system of the user. In another embodiment there is provide a memory which has stored in it a machine learning algorithm, which when provided with inputs in the form of, the diameter of a pupil of the user, and is executed, will provide as an output said estimate the activity of a locus coeruleus system; in this embodiment the method further comprises the steps of inputting the measurement (which has not been disregarded in any of the preceding steps) into the machine leaning algorithm, and outputting from the machine leaning algorithm an estimate of the current activity of the locus coeruleus system of the user.

Figure 3:
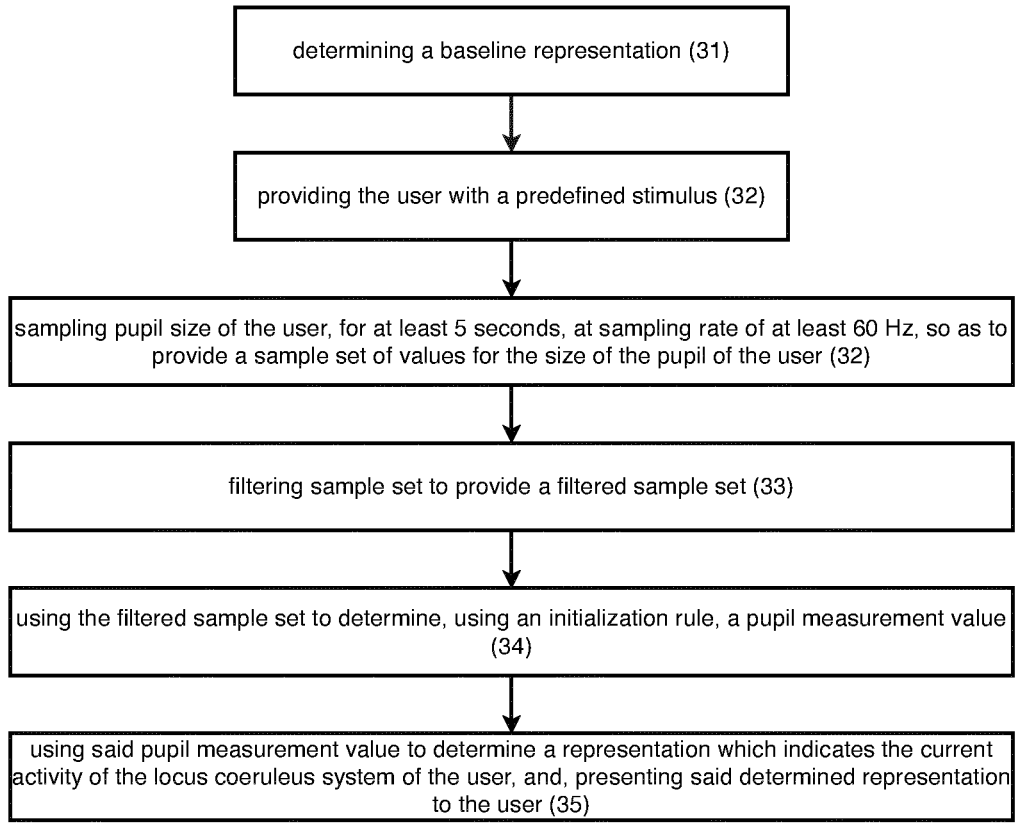
FIG. 3 illustrates the steps carried out in a computer implemented method according to a further embodiment of the present invention.

FIG. 3 illustrates the steps carried out in a computer implemented method according to a further embodiment of the present invention for, determining a representation which indicates the activity of a locus coeruleus system of a user.

In this embodiment a baseline representation is first determined (31); the baseline representation is a representation which is indicative of the initial activity of a locus coeruleus system of a user before the system operates to provide the user with a predefined stimulus. The baseline representation will form a reference; representations which will be subsequently determined (e.g. after providing the user with a predefined stimulus), can be compared to the baseline representation to allow the user to identify if the activity of their locus coeruleus system has increased or decreased in response to the predefined stimulus.

In this embodiment the baseline representation of the initial activity of a locus coeruleus system of a user is in the form of a reference spot which is displayed on a display screen, the size of the reference spot being proportional to a reference size measurement, wherein said reference size measurement is determined from measurements of the user's pupil size which are taken before the system operates to provide the user with a predefined stimulus. It should be understood that the baseline representation of the initial activity of a locus coeruleus system of a user make take any suitable form and is not limited to being in the form of a reference spot which is displayed on a display screen.

Preferably the baseline representation is determined by sampling the pupil size of the user, for a predefined time period, and at a predefined sampling rate, to provide a sample let of values for the for the size of the pupil of the user. Preferably the baseline representation is determined by sampling the pupil size of the user, for at least 5 seconds, at sampling rate of at least 60 Hz, to provide a sample set of values for the size of the pupil of the user. In this example the size of the pupil of the user is defined by the diameter of the pupil; in other words at each sample the diameter of the user's pupil is measured; and thus the resulting sample set comprises a plurality of diameter values.

Then the sample set is filtered.

Filtering the sample set preferably comprises removing the samples which were taken during a predefined time period from starting sampling. Preferably filtering the sample set comprises removing the samples which were taken during the first 2 seconds of starting sampling; the samples taken within the first 2 seconds can be corrupt due to potential light adaptations undergone by the user's pupil.

Filtering the sample set may further comprise, removing from the sample set those samples which are not within a predefined range. Preferably filtering the sample set further comprises removing from the sample set those samples which are smaller than 1.5 mm and larger than 9 mm. If for example a sample is taken while the user is blinking then the sample value will be '0' millimetre; thus removing those samples from the sample set which are not within the range 1.5 mm-9 mm allows to filter out those samples in the sample set which are not meaningful.

Filtering the sample set may further comprise, removing from the sample set those samples values which differ from an immediately previous sample value, by more than a predefined amount. Preferably filtering the sample set further comprises, removing from the sample set, those samples values which differ from an immediately previous sample value, by more than 10 mm/s. Preferably this is done after the steps of removing the samples which were taken during a predefined time period (e.g. during the first 2 seconds of starting sampling) and removing from the sample set those samples which are not within a predefined range (e.g. those samples which are smaller than 1.5 mm and larger than 9 mm), have been performed.

After the sample set has been filtered said reference size measurement is then determined from the sample set using an initialization rule. It should be understood that the initialization rule may take any suitable form. In the most preferred embodiment the initialization rule is simply the average of all the sample values remaining in the sample set after the sample set has been filtered. In other words in this preferred embodiment the reference size measurement is equal to the average of all the sample values remaining in the sample set after the sample set has been filtered.

As mentioned, in this preferred embodiment the baseline representation of the initial activity of a locus coeruleus system of the user is in the form of a reference spot which is displayed on a display screen; thus a spot, having dimensions which are proportional to the reference size measurement (which in this embodiment is equal to the average of all the sample values remaining in the sample set after the sample set has been filtered), is displayed on the display screen so as to provide the baseline representation.

In one embodiment a further step of using a predefined conversion formula to convert the reference size measurement into an estimate of the activity of a locus coeruleus system of the user, is carried out so as to provide a baseline estimate of the activity of the locus coeruleus system of the user. An exemplary predefined conversion formula has the form: $LC(p)=k*p+c$, wherein, 'p' is the measured pupil size, 'k' is a factor which describes the conversion from pupil size into activity of the locus coeruleus system (LC) and, and 'c' is an offset between the pupil size and locus coeruleus activity. It should be understood that the variable 'c' is included in the predefined conversion formula only if there is some offset between the pupil size and locus coeruleus activity. This exemplary predefined conversion is derived from the observation that the ratio of the relative rate of change of both the pupil size 'p' and activity of the locus coeruleus system (LC) is constant under isoluminance (i.e. $dLC/dp=k$). Integration of $dLC/dp=k$ with respect to variable 'p' leads to the linear equation $LC(p)=k*p+c$ which defines the above-mentioned exemplary predefined conversion formula. In humans, a typical measure of locus coeruleus system activity can be done by measuring blood oxygen level dependent (BOLD) signal which is recorded during functional magnetic resonance imaging (fMRI); this typical measure is essentially the ratio of magnetic susceptibility of oxygenated blood divided by the magnetic susceptibility of deoxygenated blood and therefore unitless. Accordingly, the variable 'k' has units [mm−1] and variable 'c' is unitless and both can be estimated by measuring both (pupil size and LC activity) at the same time. In another embodiment there is provided a memory which has stored in it a deterministic algorithm, which, when provided with an inputs in the form of the diameter of a pupil of the user, and is executed, will provide as an output an estimate the activity of a locus coeruleus system; in this embodiment the method further comprises the steps of inputting the reference size measurement into the deterministic algorithm, and outputting from the deterministic algorithm a baseline estimate of the activity of the locus coeruleus system of the user. In another embodiment there is provide a memory which has stored in it a machine learning algorithm, which when provided with inputs in the form of, the diameter of a pupil of the user, and is executed, will provide as an output said estimate the activity of a locus coeruleus system; in this embodiment the method further comprises the steps of inputting the reference size measurement into the machine leaning algorithm, and outputting from the machine leaning algorithm a baseline estimate of the activity of the locus coeruleus system of the user.

After the baseline representation of the activity of the locus coeruleus system of the user has been determined, then a representation which indicates the current activity of a locus coeruleus system of a user is determined and is presented to the user.

In this embodiment the representation which indicates the current activity of a locus coeruleus system of a user is in the form of a spot which is displayed on a display screen, the size of the spot being proportional to a measurement which is determined from measurements of the user's pupil size which are taken after the system operates to provide the user with a predefined stimulus. It should be understood that the representation which indicates the current activity of the locus coeruleus system of the user may take any suitable form and is not limited to being in the form of a spot which is displayed on a display screen.

In this embodiment in order to determine the representation which indicates the current activity of a locus coeruleus system of a user, the following steps are carried out:

(a) Firstly, the user is provided with a predefined stimulus (31). The predefined stimulus is designed to either cause an increase in the activity of the locus coeruleus system of the user, or, is designed to cause a decrease in the activity of the locus coeruleus system of the user. The predefined stimulus may comprise one or more of, a predefined visual stimulus, a predefined audio stimulus, a predefined haptic stimulus, and/or a predefined olfactory stimulus. The stimulus to increase activity in the locus coeruleus system of the user could be, for example, an image of a spider (if the user is afraid of spiders) (or some other image which triggers a stress in the user) presented to the user on the display screen; and/or a loud high-pitch tone played via loudspeakers; and/or an uncomfortable vibration applied via haptic actuators; and/or an obnoxious smell. Conversely, the stimulus to decrease activity in the locus coeruleus system of the user could be a simple dot; and/or a pleasant picture; and/or a melodic sound; and/or a pleasant vibration or smell.

(b) Secondly a step of sampling pupil size of the user, for a predefined time period, at a predefined sample rate, is carried out, so as to provide a sample set of values for the size of the pupil of the user (32). Specifically, in this embodiment the step of sampling the pupil size of the user, for at least 5 seconds, at sampling rate of at least 60 Hz, is carried out, so as to provide a sample set of values for the size of the pupil of the user. In this example the size of the pupil of the user is represented by the diameter of the pupil; in other words each sample comprises a measurement of the diameter of the users pupil; and thus the resulting sample set comprises a plurality of diameter values.

(c) Thirdly, the sample set is then filtered to provide a filtered sample set (33).

Filtering the sample set preferably comprises removing the samples which were taken during a predefined time period from starting sampling. Preferably, filtering the sample set comprises removing the samples which were taken during the first 2 seconds of starting sampling; the samples taken within the first 2 seconds can be corrupt due to potential light adaptations undergone by the user's pupil.

Filtering the sample set may further comprise, removing from the sample set those samples which are not within a predefined range. Preferably filtering the sample set further comprises, removing from the sample set those samples which are smaller than 1.5 mm and larger than 9 mm. If for example a sample is taken while the user is blinking then the sample value will be '0' millimetre; thus removing those samples from the sample set which are not within the range 1.5 mm-9 mm allows to filter out those samples in the sample set which are not meaningful.

Filtering the sample set may further comprise, removing from the sample set, those samples values which differ from a previous sample value (preferably the immediately previous sample value), by more than a predefined amount. Preferably filtering the sample set comprises, removing from the sample set, those samples values which differ from an immediately previous sample value, by more than 10 mm/s. Preferably this is done after the steps of removing the samples which were taken during a predefined time period (e.g. during the first 2 seconds of starting sampling) and removing from the sample set those samples which are not within a predefined range (e.g. those samples which are smaller than 1.5 mm and larger than 9 mm), have been performed.

(d) Fourthly, after the sample set has been filtered to provide a filtered sample set, the filtered sample set is used to determine, using an initialization rule, a pupil measurement value (34). It should be understood that the initialization rule may take any suitable form. In the most preferred embodiment the initialization rule is simply the average of all the sample values in the filtered sample set.

In other words in this preferred embodiment the pupil measurement value is equal to the average of all the sample values in the filtered sample set; since each sample in the filtered sample set is a respective diameter of the pupil size, the average of all sample values in the filtered sample set will be an average diameter of the pupil size.

(e) Fifthly, the pupil measurement value is then used to determine a representation of the current activity of the user's locus coeruleus system and said determined representation is presented to the user (35).

In this embodiment the representation which indicates the current activity of a locus coeruleus system of the user is in the form of a spot which is displayed on a display screen; the dimensions of the spot are proportional to said pupil measurement value. Thus, in this embodiment a spot having dimensions which are proportional to said pupil measurement value is displayed on a display screen so that the user is provided with a visual representation which indicates the current activity of their locus coeruleus system. If the activity of the locus coeruleus system of the user increases in response to the predefined stimulus, the size of the pupil of the user will increase, and thus said pupil measurement value will increase which in turn results in an increase in the size of the spot which is displayed on the display screen. Likewise, if the activity of the locus coeruleus system of the user decreases in response to the predefined stimulus, the size of the pupil of the user will decrease, and thus said pupil measurement value will decrease which in turn results in an decrease in the size of the spot which is displayed on the display screen.

In another embodiment a previously presented representation of the activity of the user's locus coeruleus system is updated, based on said pupil measurement value and an update rule, so that the representation which is displayed on the display screen represents the current activity of the user's locus coeruleus system. For example, the update rule may be an average of a previous pupil measurement value and the most recent pupil measurement value. Thus in one embodiment the steps of, determining the average of the previous pupil measurement value and the most recent pupil measurement value, is carried out; and adjusting the size of spot which is displayed on the display screen so that the spot has dimensions which are proportional to said average, so that the user is provided with an updated representation (i.e. visual representation) which indicates the current activity of their locus coeruleus system.

If no previous measurement has been taken then there will be no previous pupil measurement value; in such a case the reference size measurement may be used instead; in other words the method comprises determining the average of said most recent pupil measurement value and the reference size measurement; and adjusting the size of the spot which is displayed on the display screen so that it has dimensions which are proportional to said average, so that the user is provided with an updated representation (i.e. visual representation) which indicates the current activity of their locus coeruleus system.

In one embodiment a previous representation of the activity of the user's locus coeruleus system and the most recent representation may be displayed simultaneously on the display screen so that the user can see how the activity of the activity of their locus coeruleus system has changed since the previous measurement. For example, the method may comprise simultaneously displaying on the display screen, a first spot which has dimensions proportional to the most recent pupil measurement value, and a second spot which has dimensions proportional to a previous pupil measurement value.

If there is no previous pupil measurement value then the reference size measurement is used instead. For example, a first spot having dimensions which are proportional to said pupil measurement value (which was determined after providing the user with a predefined stimulus) is displayed on a display screen, and, a second spot which has dimensions proportional to the reference size measurement (which was determined prior to providing the user with a predefined stimulus) is displayed on the display screen. Preferably both the first and second spots are displayed simultaneously on the display screen. The user can thus easily see how activity of their locus coeruleus system has changed relative to when the baseline representation was determined; in other words the user can see how activity of their locus coeruleus system has changed in response to the predefined stimulus. For example if the first spot is larger than the second spot then the user can determine that the activity of their locus coeruleus system increased in response to the predefined stimulus; if the first spot is smaller than the second spot then the user can determine that the activity of their locus coeruleus system decreased in response to the predefined stimulus.

In one embodiment the reference size measurement is subtracted from the pupil measurement value to provide a differential pupil size value. The differential pupil size value is presented to the user. If the differential pupil size value is a positive value then this will indicate to the user that the activity of their locus coeruleus system has increased in response to the predefined stimulus which was provided; if the differential pupil size value is a negative value then this will indicate to the user that the activity of their locus coeruleus system has decreased in response to the predefined stimulus which was provided.

In one embodiment a further step of using a predefined conversion formula to convert said pupil measurement value into an estimate of the activity of a locus coeruleus system of the user so as to provide an estimate of the current activity of the locus coeruleus system of the user. An exemplary predefined conversion formula has the form: $LC(p)=k*p+c$, wherein, 'p' is the measured pupil size, 'k' is a factor which describes the conversion from pupil size into activity of the locus coeruleus system (LC) and, and 'c' is an offset between the pupil size and locus coeruleus activity. It should be understood that the variable 'c' is included in the predefined conversion formula only if there is some offset between the pupil size and locus coeruleus activity. This exemplary predefined conversion is derived from the observation that the ratio of the relative rate of change of both the pupil size 'p' and activity of the locus coeruleus system (LC) is constant under isoluminance (i.e. $dLC/dp=k$). Integration of $dLC/dp=k$ with respect to variable 'p' leads to the linear equation $LC(p)=k*p+c$ which defines the above-mentioned exemplary predefined conversion formula. In humans, a typical measure of locus coeruleus system activity can be done by measuring blood oxygen level dependent (BOLD) signal which is recorded during functional magnetic resonance imaging (fMRI); this typical measure is essentially the ratio of magnetic susceptibility of oxygenated blood divided by the magnetic susceptibility of deoxygenated blood and therefore unitless. Accordingly, the variable 'k' has units [mm−1] and variable 'c' is unitless and both can be estimated by measuring both (pupil size and LC activity) at the same time. In another embodiment there is provided a memory which has stored in it a deterministic algorithm, which, when provided with an input in the form of the diameter of a pupil of the user, and is executed, will provide as an output an estimate the activity of a locus coeruleus system; in this embodiment the method further comprises the steps of inputting the pupil measurement value into the deterministic algorithm, and outputting from the deterministic algorithm an estimate of the current activity of the locus coeruleus system of the user. In another embodiment there is provide a memory which has stored in it a machine learning algorithm, which when provided with an input in the form of, the diameter of a pupil of the user, and is executed, will provide as an output said estimate the activity of a locus coeruleus system; in this embodiment the method further comprises the steps of inputting the pupil measurement value into the machine leaning algorithm, and outputting from the machine leaning algorithm an estimate of the current activity of the locus coeruleus system of the user.

Most preferably, each of the above-mentioned embodiments, further comprise presenting the user with a set of instructions which are designed to alter the activity of the user's locus coeruleus system when executed. The instructions which are presented to the user are based on either the measured size of the pupil, and/or the representation of the activity of the user's locus coeruleus system; and/or on an estimate of the current activity of the user's local coeruleus system. For example, if an estimate of the current activity of the user's local coeruleus system indicates that the activity of the user's locus coeruleus system is above a first predefined threshold level, then the user is presented with instructions which when executed by the user should assist in reducing the level of activity of their locus coeruleus system. Likewise, if an estimate of the current activity of the user's local coeruleus system is below a second predefined threshold level, then the user is presented with instructions which when executed by the user should assist in increasing the level of activity of their locus coeruleus system. The instructions may include instructions on how to breath, instructions to use mental strategies with an arousing or calming context (for example imagination of fearful situations, aggressive, joyful situations or relaxing situations), instructions to concentrate on the heartbeat or instructions to imagine flashing lights.

Most preferably, in each of the above-mentioned embodiments, the display screen on which the representation of the of the activity of the user's locus coeruleus system (which in the most preferred embodiment is a spot whose dimensions are proportional to the measured size of the user's pupil) is displayed, is configured to be isoluminant. Also preferably said representation which is displayed on the display screen is configured to be non-arousing.

Also, preferably, in each of the above-mentioned embodiments, the predefined stimulus which the system provides to the user is a visual stimulus. The visual stimulus is preferably displayed on a display screen. Preferably said display screen is configured to be isoluminant. Preferably the visual stimulus is displayed on the same display screen as the display screen on which the representation of the of the activity of the user's locus coeruleus system is displayed.

In one embodiment the representation of the activity of the locus coeruleus system which is provided to the user is continuously updated (e.g. the spot size which is displayed on the display screen is continuously updated). Preferably in this embodiment the series of steps (b)-(e) (of any of the embodiments) are continuously, repeatedly, carried out and the representation which is displayed on the display screen is continuously, repeatedly, updated.

In another embodiment the representation of the activity of the locus coeruleus system which is provided to the user is updated intermittently (e.g. the spot size which is displayed on the display screen in intermittently updated). Preferably in this embodiment the series steps (b)-(e) (of any of the embodiments) are continuously, repeatedly, carried out, but the representation which is displayed on the display screen is updated only at predefined intervals. The update of the representation will depend on all measurements taken when carrying out steps (b)-(e) during the interval. For example during the predefined interval '10' samples of the size of the users pupil may be measured and the average of those '10' samples are taken and the size of the spot on the display screen is adjusted so that it is proportional to said average; then during the next interval the next '10' samples of the size of the users pupil are measured and the average of those next '10' samples are taken and the size of the spot on the display screen is then adjusted so that it is proportional to said average. Thus, the spot size is adjusted, intermittently, only at the end of each interval.

Any of the above-mentioned methods may be executed using an assembly according to the present invention for determining a representation which indicates the activity of a locus coeruleus system of a user.

Figure 4:
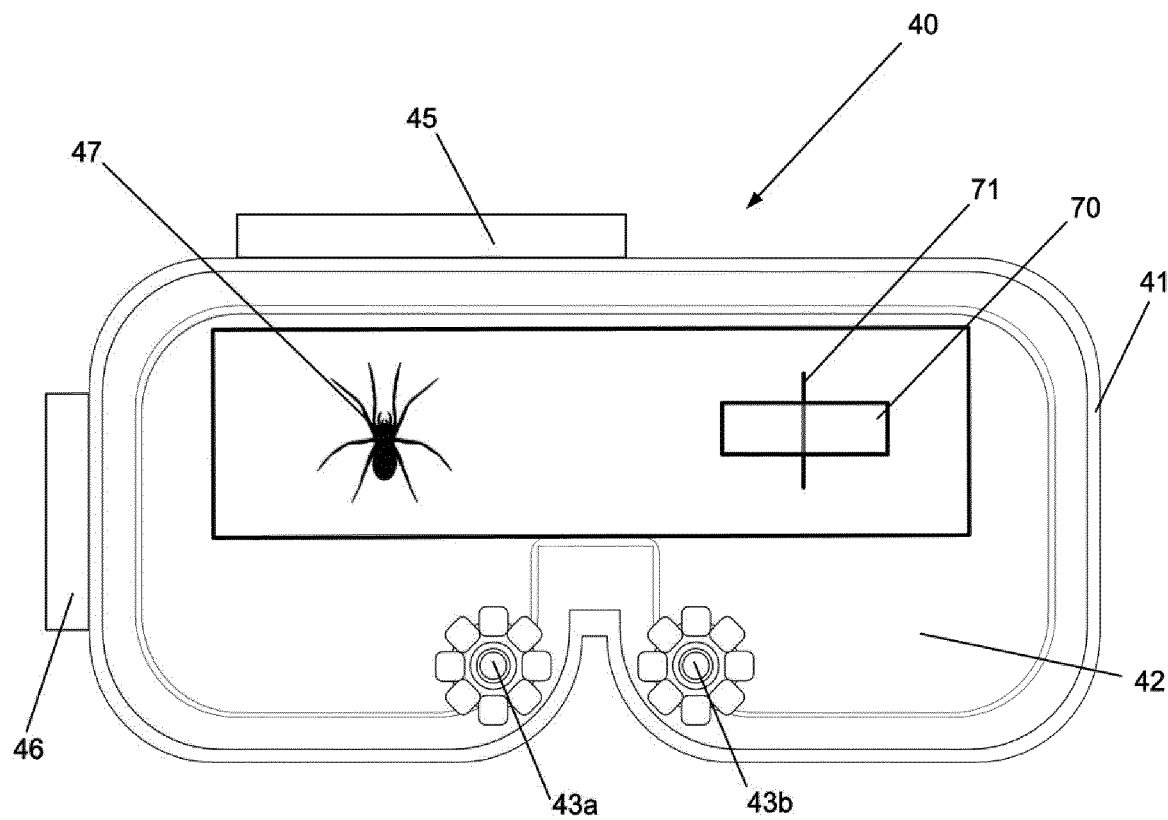
FIG. 4 illustrates an embodiment of an assembly of the present invention which can be used to perform the method for determining a representation which indicates the activity of a locus coeruleus system of a user.

FIG. 4 illustrates an embodiment of an assembly (40) which can be used to perform any of the above-mentioned method embodiments. In this case the assembly (40) comprises goggles (41) an be worn by the user; the goggles (41) comprise a display screen (42) on which the representation of the activity of the user is displayed and also on which visual stimulus can be provided to the user. The display screen (42) is configured to be isoluminant.

The goggles (41) are designed to block external light from being incident on the user eye when worn; thus the goggles (41) help to provide for controlled light conditions; when the goggles (41) are worn by the user external light conditions can no longer influence the size of the pupil; accordingly when the goggles (41) are worn by the user any changes which occur in the size of the pupil of the user can be attributed to changes in the activity of a locus coeruleus system of the user.

The assembly comprises a measurement means (43a, 43b) for measuring the diameter of the user's pupil; and a processor (45) which is operably connected to the measurement means which is configured to determine a representation which indicates the activity of a locus coeruleus system of a user, based on the diameter of a pupil of the user measured by the measurement means (in the manner described above). In this example the measurement means comprises eye tracker cameras (43a, 43b). It should be understood the measurement means may take any suitable form, but at least is preferably capable of tracking the pupil size or diameter of the user within a 0.01 mm resolution and a sensitivity over 95%.

The assembly (40) further comprises a sensory stimulation module (46) which is operable to provide a predefined stimulus to said user. The sensory stimulation module may be configured to provide any one or more of, a predefined visual stimulus, a predefined audio stimulus, predefined haptic stimulus, and/or a predefined olfactory stimulus. In this example the sensory stimulation module (46) is configured to provide a visual stimulus (47); the visual stimulus (47) is displayed on the display screen (42).

Figure 5:
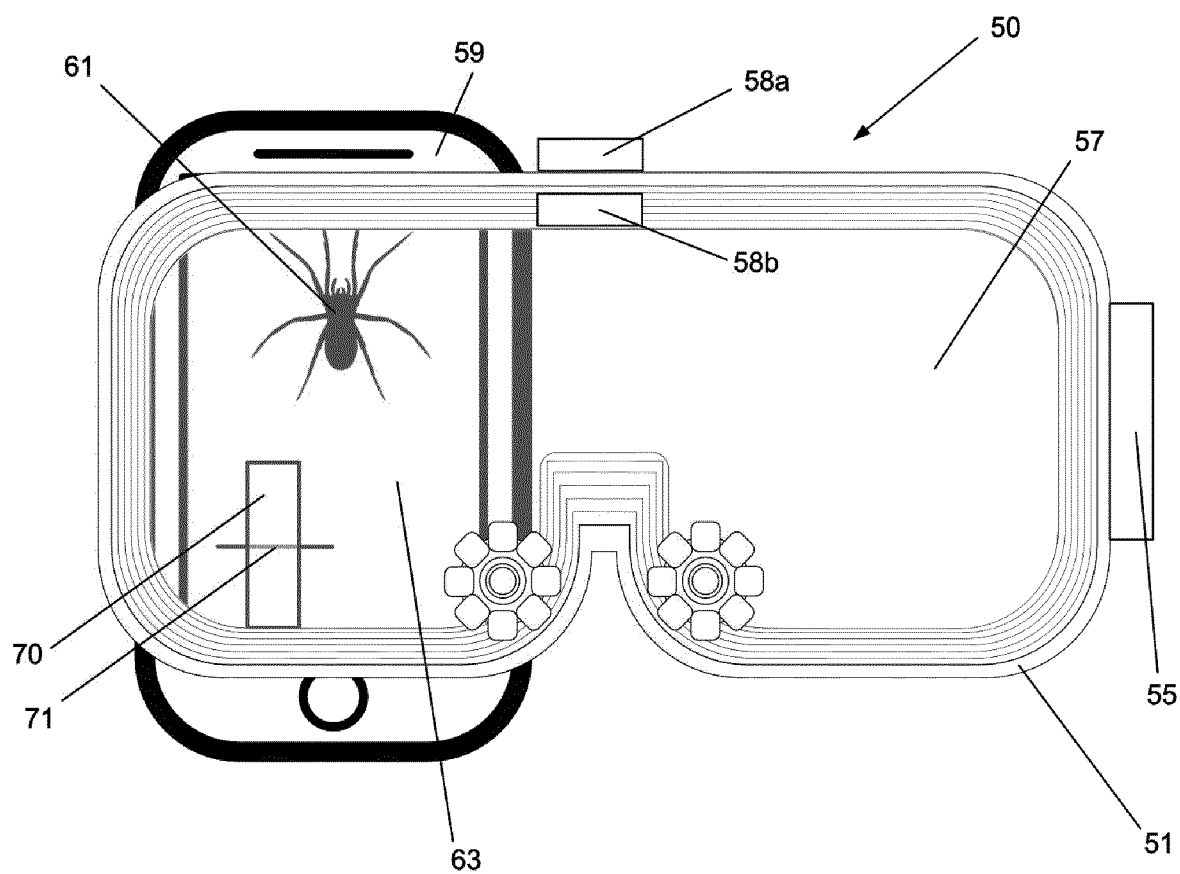
FIG. 5 illustrates a further embodiment of an assembly of the present invention which can be used to perform the method for determining a representation which indicates the activity of a locus coeruleus system of a user

FIG. 5 illustrates a further embodiment of an assembly (50) which can be used to perform any of the above-mentioned method embodiments.

The assembly (50) comprises googles (51) which, unlike the goggles (41) in the assembly (40), are not designed to block external light from being incident on the user eye; in other words changes in ambient light conditions causes changes in the light conditions inside the goggles (51).

In this assembly (50) since the goggles (51) are not designed to block external light from being incident on the user eye, the light conditions to which the user's pupil is exposed to may vary according to varying ambient light conditions. Varying light conditions will cause changes in the size of the pupil of the user which could compromise accurate determining of the representation of the activity of the locus coeruleus system of the user. In order to address this issue the goggles comprise switchable glass (57) (for example polymer-dispersed-liquid-crystal-film and luminance sensors (58a,b) which are configured to sense light conditions inside and outside of the goggles. Specifically, the assembly (50) comprises a first luminance sensor (58a) is configured to measure ambient light conditions (i.e. the light conditions outside of the goggles (51)) and a second luminance sensor (58b) is configured to measure light conditions inside of the goggles (51).

The shade of the switchable glass (57) can be adjusted, based on the light measurements taken by the luminance sensors (58a,b), so that light conditions inside the goggles (51) reach a predefined constant level. In an embodiment, the shade of the switchable glass can be made darker by increasing voltage which is supplied to the switchable glass; the shade of the switchable glass can be made brighter by decreasing the voltage which is supplied to the switchable glass.

The goggles further comprise a controller (55) which is operably connected to the luminance sensors (58a,b) and the power supply to the switchable glass (57); the controller (55) is configured to receive light measurements which are taken by the luminance sensors (58a,b) and to adjust the level of voltage which is supplied to the switchable glass (57) so that the shade of the switchable glass (57) is adjusted to bring the light conditions inside the goggles (51) to the predefined constant level.

The goggle (51) comprise a measurement means (53a, 53b) for measuring the diameter of a users pupil. In this example the measurement means comprises eye tracker cameras (53a, 53b). It should be understood the measurement means may take any suitable form, but at least is preferably capable of tracking the pupil size or diameter within a 0.01 mm resolution and a sensitivity over 95%. The measurement means (53a, 53b) are operably connected to a mobile device (59) so that the measurement means (53a, 53b) can communicate pupil size measurement to a mobile device (59). The mobile device (63) comprises a processor which is configured to determine a representation which indicates the activity of a locus coeruleus system of a user, based on the diameter of the pupil of the user measured by the measurement means (in the manner described above).

In the assembly (50) the representation which indicates the activity of a locus coeruleus system of the user is not displayed on a display screen of the goggles; the goggles (51) preferably do not have any display screen. In the assembly (50) the representation which indicates the activity of a locus coeruleus system of the user is displayed on a display screen (63) of the mobile device (59) (such as smartphone or tablet).

The mobile device (59) comprise a sensory stimulation module, which is operable to provide a predefined stimulus to said user; unlike the assembly (40) in the assembly (50) the sensory stimulation is not a part of the goggles. The sensory stimulation module may be configured to provide any one or more of, a predefined visual stimulus, a predefined audio stimulus, predefined haptic stimulus, and/or a predefined olfactory stimulus. In this example the sensory stimulation module, is configured to provide a visual stimulus (61); the visual stimulus (61) is displayed on the display screen (63) of the mobile device (59).

It should be noted that any of the method embodiments of the present invention may comprise further steps to take account of the light conditions which are measured by the luminance sensors (58a,b). For example any of the above mentioned method embodiments for determining a representation which indicates the activity of a locus coeruleus system of a user, may further comprise the steps of, measuring the light conditions inside the goggles and outside the goggles, at least during the period when the user is being provided with the predefined stimulus; adjusting the shade of the switchable glass in the goggles to compensate for changes in light conditions so that the light conditions to which the user's pupils are exposed to inside the goggles are maintained at a predefined constant light level at least as the user is being provided with the predefined stimulus. The method may further comprise the step of disregarding any pupil size measurements or pupil size samples which were taken during a period when the light conditions within the goggles were not at said predefined constant light level (i.e. light conditions to which the users pupils are exposed to inside the goggles were not at said predefined constant light level).

During use of the assembly (50), if the light conditions outside the goggles (51) increase in brightness, then a step of increasing the darkness of the switchable glass (57) is carried out; the darkness of the switchable glass (57) is increased until the light conditions within the goggles (51) reach the predefined constant light level. Likewise, if the light conditions outside the goggles (51) decrease in brightness, then a step of decreasing the darkness of the switchable glass (57) is carried out; the darkness of the switchable glass (57) is decreased until the light conditions within the goggles (51) reach the predefined constant light level. The method may further comprise disregarding any pupil size measurements or pupil size samples which were taken during a period when the light conditions within the goggles were not at said predefined constant light level (e.g. during the period when the darkness of the switchable glass was in adjustment). In an embodiment, the shade of the switchable glass (57) can be made darker by increasing voltage which is supplied to the switchable glass (57); and the shade of the switchable glass (57) can be made brighter by decreasing the voltage which is supplied to the switchable glass (57).

It should be understood that while the assembly (50) comprises goggles (51) which have switchable glass so that light conditions to which the user's eyes are exposed can be maintained at a predefined light condition, it should be understood that the assembly (50) could comprise any form of light compensation means which is operable to compensate for fluctuations in light conditions to which the user's pupils are exposed to can be maintained at a predefined light condition. For example, instead of the goggles (51) which have switchable glass, the assembly (50) may comprise any other suitable light compensation means such as, for example light adaptive glasses, light adaptive contact lenses, a static virtual reality setup, a mobile virtual reality setup, a static augmented reality setup, and/or mobile augmented reality setup.

In each of the assemblies (40, 50) the representation which indicates the activity of a locus coeruleus system of the user in the form of a scale (70); the position of a bar (71) on the scale will change according to measured size of the pupil of the user; when the bar (71) is moving towards a first end of the scale (70) this indicates that the activity of the locus coeruleus system of the user is increasing, and when the bar (71) is moving towards a second, opposite, end of the scale, this indicates that the activity of the locus coeruleus system of the user is decreasing.

Also, in each of above-mentioned assembly embodiments the measurement means are in the form of eye tracker cameras; however it should be understood that the measurement means may take any suitable form such as, for example, one or more infra-red cameras and/or one or more camera contact lenses.

Also, in each of above-mentioned assembly embodiments it should be understood that the sensory stimulation module may be configured to provide any suitable stimulus to said user; preferably the sensory stimulation module is configured to provide at least one of, a visual stimulus, tactile/haptic stimulus, a auditory stimulus, a gustatory stimulus, a olfactory stimulus. The sensory stimulation module may comprise at least one of haptic actuators, vibrotactile stimulators, electrical stimulators, speakers, headphones.

Also, each of the above-mentioned assembly embodiments may further comprise a means for measuring the heart rate of the user; the processor may be configured to use the measured heart rate when estimating the activity of a locus coeruleus system of the user.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A computer implemented method for determining a representation which indicates the activity of a locus coeruleus system of a user, comprising the steps of,
   measuring the size of a pupil of a user;
   providing a representation the appearance of which is based on the measured size of the pupil;
   displaying on a display screen instructions which are designed to decrease or increase the activity of the activity of a locus coeruleus system of a user, when executed by the user; wherein the content of the instructions which are displayed is dependent on the measured size of the pupil of the user.

2. A method according to claim 1 wherein, the method comprises determining the representation which indicates the current activity of a locus coeruleus system of a user, by,
   providing the user with a predefined stimulus;
   measuring the size of the user's pupil to provide a measurement;
   checking said measurement to determine if it lies within a predefined range, and disregarding the measurement if it falls outside of said predefined range;
   provided that said measurement does lie within said predefined range, the difference between said measurement and a previously taken measurement is determined, and the difference is compared to a threshold value, and disregarding said measurement if said difference is greater than said predefined threshold;
   provided that said measurement has not been disregarded in any of the preceding steps, using said measurement to determine the appearance of said representation.

3. A method according to claim 2 wherein, said step of using said measurement to determine the appearance of the representation comprises, displaying on a display screen a spot having dimensions which are proportional to said measurement.

4. A method according to claim 1 wherein, the method comprises determining the representation which indicates the current activity of a locus coeruleus system of a user, by,
   providing the user with a predefined stimulus;
   sampling the size of the pupil of the user, for at least 5 seconds, at sampling rate of at least 60 Hz, so as to provide a sample set of values for the size of the pupil of the user;
   filtering the sample set so as to provide a filtered sample set;
   provided that said measurement has not been disregarded in any of the preceding steps, using said measurement to determine the representation;
   the filtered sample set is used to determine, using an initialization rule, a pupil measurement value;
   the pupil measurement value is used to determine the appearance of said representation.

5. A method according to claim 4 wherein, said step of using said pupil measurement value to determine the appearance of the representation comprises, displaying on a display screen a spot having dimensions which are proportional to said pupil measurement value.

6. A method according to claim 4 wherein, the step of filtering the sample set comprises at least one of,
   removing the samples from the sample set which were taken during the first 2 seconds of starting to sampling; and/or
   removing samples from the sample set which are outside of a predefined range; and/or,
   removing from the sample set, those samples which differ from an immediately previous sample, by more than a predefined amount.

7. A method according to claim 4 wherein the initialization rule is the average of all the sample values in the filtered sample set.

8. A method according to claim 2 wherein said predefined stimulus is designed to either cause an increase in the activity of the locus coeruleus system of a user, or, to cause a decrease in the activity of the locus coeruleus system of a user.

9. A method according to claim 1 wherein the method further comprises the step of determining a baseline representation, wherein the baseline representation is a representation which is indicative of the initial activity of a locus coeruleus system of the user before the system operates to provide the user with a predefined stimulus.

10. A computer implemented method for estimating the activity of a locus coeruleus system of the user, the method comprising the step of,
    measuring the size of a pupil of a user;
    converting the measure size of the pupil into an estimate of the activity of a locus coeruleus system of the user;
    displaying on a display screen instructions which are designed to decrease or increase the activity of the activity of a locus coeruleus system of a user, when executed by the user; wherein the content of the instructions which are displayed is dependent on the measured size of the pupil of the user.

11. A method according to claim 10 wherein the step of converting the measured size of the pupil into an estimate of the activity of a locus coeruleus system of the user comprises any one of,
converting, using a predefined conversion formula, the measured size of the pupil into an estimate of the activity of a locus coeruleus system of the user; and/or
converting, using a deterministic algorithm, which is configured such that when the deterministic algorithm is provided with an input in the form of the diameter of a pupil of the user, and is executed, will provide as an output an estimate the activity of a locus coeruleus system; and/or
converting, using a machine learning algorithm, which is configured such that when the machine learning algorithm is provided with an input in the form of, the diameter of a pupil of the user, and is executed, will provide as an output said estimate the activity of a locus coeruleus system.

12. An assembly which can be used to perform the method according to claim 1, the assembly comprising, goggles which are configured to block out ambient light when worn;
wherein said goggle comprise isoluminant display screen on which the representation which indicates the activity of a locus coeruleus system of the user can be displayed;
a sensory stimulator, which is operable to provide a predefined stimulus to said user;
a measurement device for measuring the diameter of the user's pupil; and
a processor which is operably connected to the measurement device and which is configured to determine the representation which indicates the activity of a locus coeruleus system of a user, based on the diameter of a pupil of the user measured by the measurement device and to displaying on a display screen instructions which are designed to decrease or increase the activity of the activity of a locus coeruleus system of a user, when executed by the user, wherein the content of the instructions which are displayed is dependent on the measured size of the pupil of the user.

13. An assembly which can be used to perform the method according to claim 1, the assembly comprising,
goggles which are translucent to ambient light;
wherein said goggles comprise, switchable glass and luminance sensors which are configured to sense light conditions inside and outside of the goggles;
a controller which is operably connected to the luminance sensors and a power supply to the switchable glass, wherein the controller is configured to receive light measurements which are taken by the luminance sensors and to adjust the level of voltage which is supplied by the power supply to the switchable glass so that the shade of the switchable glass is adjusted to bring the light conditions inside the goggles to a predefined constant level; and
a measurement device for measuring the diameter of the user's pupil, wherein said measurement device is configured so that it can communicate with a mobile device;
a mobile device, wherein said mobile device comprises a processor which can determine a representation which indicates the activity of a locus coeruleus system of a user based on the diameter of a pupil of the user measured by the measurement device; and wherein said mobile device comprises a display screen on which said representation can be displayed; and wherein the mobile device is configured to display on a display screen instructions which are designed to decrease or increase the activity of the activity of a locus coeruleus system of a user, when executed by the user, wherein the content of the instructions which are displayed is dependent on the measured size of the pupil of the user.

14. A computer implemented method for determining a representation which indicates the activity of a locus coeruleus system of a user, comprising the steps of, providing the user with a predefined stimulus;
sampling the size of the pupil of the user, for at least 5 seconds, at sampling rate of at least 60 Hz, so as to provide a sample set of values for the size of the pupil of the user;
filtering the sample set so as to provide a filtered sample set;
provided that said measurement has not been disregarded in any of the preceding steps, using said measurement to determine the representation;
the filtered sample set is used to determine, using an initialization rule, a pupil measurement value;
providing a representation the appearance of which is based on the measured size of the pupil, wherein the pupil measurement value is used to determine the appearance of said representation.

* * * * *